United States Patent Office 2,998,451
Patented Aug. 29, 1961

2,998,451
UNSATURATED MERCAPTO AMINES
Hermann V. Boenig, Akron, Ohio, assignor to The Goodyear Tire & Rubber Company, Akron, Ohio, a corporation of Ohio
No Drawing. Filed Jan. 27, 1958, Ser. No. 711,146
5 Claims. (Cl. 260—570.5)

This invention relates to new compositions of matter and methods for their preparation. More specifically it relates to bis (mercapto organic) unsaturated tertiary amines and to methods for their preparation.

These new compositions are prepared by reacting approximately one mole of an unsaturated primary mono amine with two moles of a cyclic organic sulfide containing not more than four carbon atoms in the cyclic ring. Representative examples of the cyclic sulfides employed in the practice of this invention are ethylene sulfide, propylene sulfide, trimethylene sulfide, tetrahydrothiophene, butadiene monosulfide, styrene sulfide, allyl ethylene sulfide, the substituted tetrahydrothiophenes such as methyl tetrahydrothiophene and allyl tetrahydrothiophene and the substituted trimethylene sulfides such as 3,3 bis-chloromethyl trimethylene sulfide and 3,3 bis-hydroxymethyl trimethylene sulfide.

The unsaturated primary mono amines employed in the practice of this invention are those containing a non-aromatic

group. Representative examples of these amines are allyl amine, methallyl amine, crotyl amine, allyl aniline and crotyl aniline.

Using allyl amine and ethylene sulfide as representative reactants the process of this invention is illustrated by the following equation:

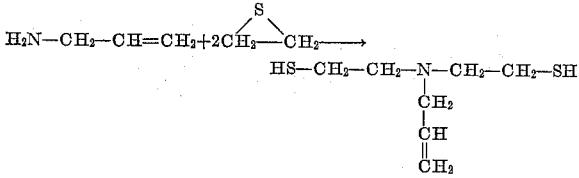

The process may be carried out in solution using polar solvents having relatively low boiling points such as methyl alcohol or ethyl alcohol. An excess of the sulfide, up to 4 moles to 1 mole of amine, is employed to insure completion of the reaction and high yields. Since the reaction is exothermic, heating is not generally necessary although heating may sometimes be helpful particularly toward the end of the reaction. When the temperature of the mixture exceeds the boiling point of the amine, the reaction can be considered complete. Vacuum distillation is used to separate the solvent and any excess reactants from the reaction product.

Alternatively the process may be carried out in bulk in an autoclave. Theoretical amounts (1 to 2 ratio) of the amine and sulfide are charged to a pre-cooled autoclave, which is then heated to from 45 to 80° C. and preferably to about 55° C. It is observed that the temperature of the reaction mixture remains fairly constant until the exothermic reaction begins. Suddenly the temperature rises and then returns to the original temperature, indicating a completion of the reaction. The product is then purified by vacuum distillation.

The new compositions of this invention may be defined by the formula

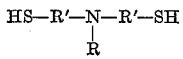

in which R is an organic radical containing a non-aromatic

group and R' is an alkylene radical containing not less than 2 nor more than 4 carbon atoms linking the thiol group with the amine nitrogen atom.

In the formula shown above R' may be such radicals as

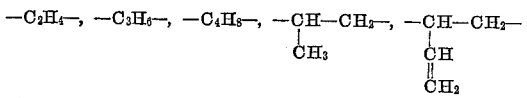

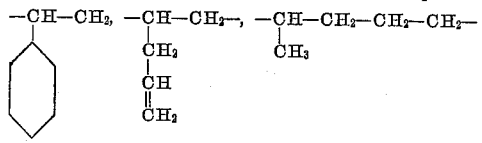

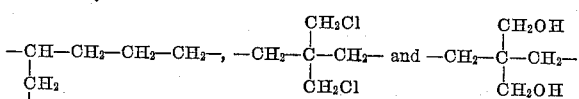

R may be such unsaturated radicals as

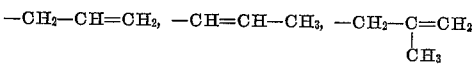

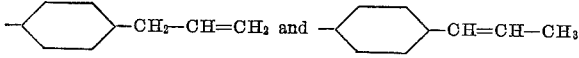

Representative examples of specific bis-mercapto unsaturated tertiary amines coming within the scope of this invention are bis-(mercapto ethyl) allyl amine, bis-(mercapto propyl) allyl amine, bis-(mercapto methyl ethyl) allyl amine, bis-(mercapto vinyl ethyl) allyl amine, bis-(mercapto phenyl ethyl) allyl amine, and bis-(mercapto allyl ethyl) allyl amine. Of particular interest are those unsaturated tertiary amines made from the cyclic sulfides which are substituted with radicals containing additional functional groups such as the chloro, hydroxyl, vinyl or allyl groups which provide additional points of reaction in those polymers made from the compositions of this invention.

These compositions, because of their common bis-thiol and pendant or extra-linear unsaturation, are useful in preparing polythioesters for reaction with diisocyanates to make polyurethanes and useful for placing pendant unsaturation along the molecular chain of linear polyester/diisocyanate reaction products such as those described in copending application Serial No. 711,147, filed January 27, 1958. The polyurethane reaction products prepared with the new compositions of this invention are capable of being cross-linked or cured by means of sulfur or peroxides as is more fully described in the application referred to above.

The practice of this invention is further illustrated by the following examples which are representative rather than restrictive of the scope of this invention.

*Example 1*

Allylamine (19 grams) was dissolved in 200 milliliters of ethyl alcohol and charged to a 500 milliliter three-necked flask equipped with a condenser and thermometer. Ethylene sulfide (40 grams) was added. The solution was heated to reflux for 4 days. The solvent was stripped off and the solution was vacuum distilled at 0.39 millimeter of mercury leaving very little residue. The product was a colorless viscous oil having a boiling point of 132° C. at 0.39 millimeter of mercury and a sulfur content of 33.8% as compared to a theoretical sulfur content of 36.0%.

*Example 2*

Allylamine (19 grams) was refluxed with 49.5 grams of propylene sulfide in the presence of 200 milliliters of ethyl alcohol for four days. The solvent and excess reactants were then stripped off. The residue was then distilled at 0.38 millimeter of mercury. The product was a colorless light-viscous oil having a boiling point of 89-90° C. at 0.38 millimeter of mercury and a sulfur content of 31.2% as compared to a theoretical sulfur content of 31.4%.

Other bis-mercapto unsaturated tertiary amines can be prepared in accordance with the general procedures shown in Examples 1 and 2 by substituting for allylamine such other unsaturated primary mono amines as methallyl amine, crotyl amine, allyl aniline or crotyl aniline and by substituting for ethylene or propylene sulfide such other cyclic sulfides as trimethylene sulfide, tetrahydrothiophene, butadiene monosulfide, styrene sulfide, allyl ethylene sulfide, methyl tetrahydrothiophene, allyl tetrahydrothiophene; 3,3 bis-chloromethyl trimethylene sulfide and 3,3 bis-hydroxymethyl trimethylene sulfide. The cyclic sulfides employed to prepare the compositions of this invention are conveniently prepared from the corresponding cyclic oxides by reaction with thiourea in accordance with known procedures.

While certain representative embodiments and details have been shown for the purpose of illustrating the invention, it will be apparent to those skilled in this art that various changes and modifications may be made therein without departing from the spirit or scope of the invention.

I claim:

1. As compositions of matter the bis-mercapto tertiary amines defined by the formula $$HS-R'-N-R'-SH$$
$$\phantom{HS-R'-N}|\phantom{-R'-SH}$$
$$\phantom{HS-R'-N}R$$

in which R' is selected from the group consisting of $-C_2H_4-$, $-C_3H_6-$, $-C_4H_8-$, $-CH-CH_2-$, $-CH-CH_2-$
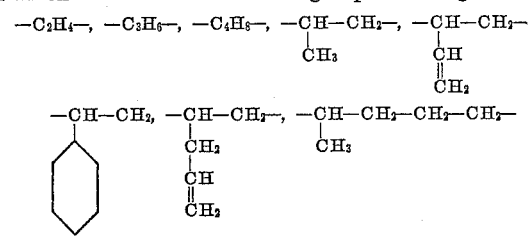

and R is selected from the group consisting of $-CH_2-CH=CH_2$, $-CH=CH-CH_3$, $-CH_2-C=CH_2$
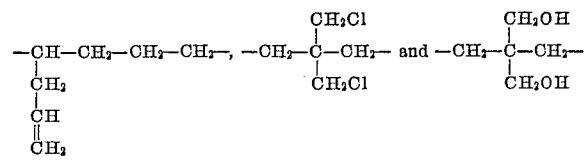

2. The compositions defined by claim 1 in which R is $-CH_2-CH=CH_2$.

3. The compositions defined by claim 1 in which R' is $-CH_2-CH_2-$.

4. The compositions defined by claim 1 in which R' is $$-CH-CH_2-$$
$$\phantom{-CH}|\phantom{CH_2-}$$
$$\phantom{-CH}CH_3$$

5. The compositions defined by claim 1 in which R' is

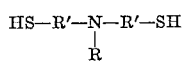

References Cited in the file of this patent

UNITED STATES PATENTS

| | | |
|---|---|---|
| 2,105,845 | Reppe et al. | Jan. 18, 1938 |
| 2,172,822 | Tamele | Sept. 12, 1939 |
| 2,191,753 | Coffman | Feb. 27, 1940 |
| 2,497,553 | Long | Feb. 14, 1950 |
| 2,505,870 | Snyder et al. | May 2, 1950 |
| 2,769,840 | Sowa | Nov. 6, 1956 |

OTHER REFERENCES

Richter: "Organic Chemistry," vol. 3 (1923), page 12.
"The Chemistry of Org. Compounds," Conant-Macmillan, New York, pp. 264-265 (1947).

UNITED STATES PATENT OFFICE
CERTIFICATE OF CORRECTION

Patent No. 2,998,451                         August 29, 1961

Hermann V. Boenig

It is hereby certified that error appears in the above numbered patent requiring correction and that the said Letters Patent should read as corrected below.

Column 2, lines 15 to 20, and column 3, lines 45 to 50, after "-$CH_2$", first occurrence in the top line, strike out the comma; column 4, line 10, for the portion of the formula reading "-$CH_2$-$CH_2$=$CH_2$," read -- -$CH_2$-CH=$CH_2$, --.

Signed and sealed this 26th day of June 1962.

(SEAL)
Attest:

ERNEST W. SWIDER                         DAVID L. LADD
Attesting Officer                            Commissioner of Patents